(12) United States Patent
Wang et al.

(10) Patent No.: US 12,353,868 B2
(45) Date of Patent: Jul. 8, 2025

(54) FIRMWARE OVER-THE-AIR (FOTA) FAILURE REDUCTION FOR AUTONOMOUS DRIVING VEHICLE

(71) Applicant: Apollo Autonomous Driving USA LLC, Sunnyvale, CA (US)

(72) Inventors: Qiang Wang, Sunnyvale, CA (US); Manjiang Zhang, Sunnyvale, CA (US); Congshi Huang, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 178 days.

(21) Appl. No.: 18/190,706

(22) Filed: Mar. 27, 2023

(65) Prior Publication Data

US 2024/0329961 A1    Oct. 3, 2024

(51) Int. Cl.
*G06F 9/445* (2018.01)
*G06F 8/65* (2018.01)
*G06F 11/14* (2006.01)
*H04L 67/12* (2022.01)
*B60W 60/00* (2020.01)

(52) U.S. Cl.
CPC ............ *G06F 8/65* (2013.01); *G06F 11/1433* (2013.01); *H04L 67/12* (2013.01); *B60W 60/001* (2020.02); *B60W 2556/45* (2020.02); *G06F 2201/865* (2013.01)

(58) Field of Classification Search
CPC .. G06F 8/65; G06F 11/1433; G06F 2201/865; H04L 67/12; B60W 2556/45; B60W 60/001
USPC .................................................. 717/168–178
See application file for complete search history.

(56) References Cited

U.S. PATENT DOCUMENTS

2022/0067525 A1\*  3/2022  Sequeira ............... B60W 10/04
2023/0017403 A1\*  1/2023  Vladimerou .......... H04W 24/02

\* cited by examiner

*Primary Examiner* — Chuck O Kendall
(74) *Attorney, Agent, or Firm* — WOMBLE BOND DICKINSON (US) LLP

(57) ABSTRACT

An autonomous driving vehicle (ADV) includes a computer network that includes at least one wireless gateway. The ADV also includes a plurality of network components coupled to the computer network, the plurality of network components including a target device. The ADV also includes a processor, configured to receive, through the at least one wireless gateway, a firmware to be installed on the target device, and to direct the firmware to the target device through a first network path of the computer network. In response to detecting a failure to update the target device with the firmware, the processor directs the firmware to the target device through a second network path of the computer network.

20 Claims, 9 Drawing Sheets

FIRMWARE OVER-THE-AIR (FOTA) FAILURE REDUCTION FOR AUTONOMOUS DRIVING VEHICLE

FIELD

Embodiments of the present disclosure relate generally to operating autonomous driving vehicles. More particularly, embodiments of the disclosure relate to performing a firmware over-the-air video update of one or more components of autonomous driving vehicles with reduced failure.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. For example, an autonomous vehicle may drive a passenger to a target destination without a human to provide steering commands, throttle, or braking.

An autonomous driving vehicle (ADV) may include numerous electronic components to perform the various autonomous driving tasks. Firmware updates to these components may be created long after the ADV has left the manufacturer floor and has been sold to a user. Firmware updates, however, may fail from time to time, due to various circumstances such as, for example, a software incompatibility, a hardware failure, or intermittent communication. Therefore, it may be beneficial to update these components wirelessly in a manner that reduces or mitigates failure of such updates.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Figure 1:
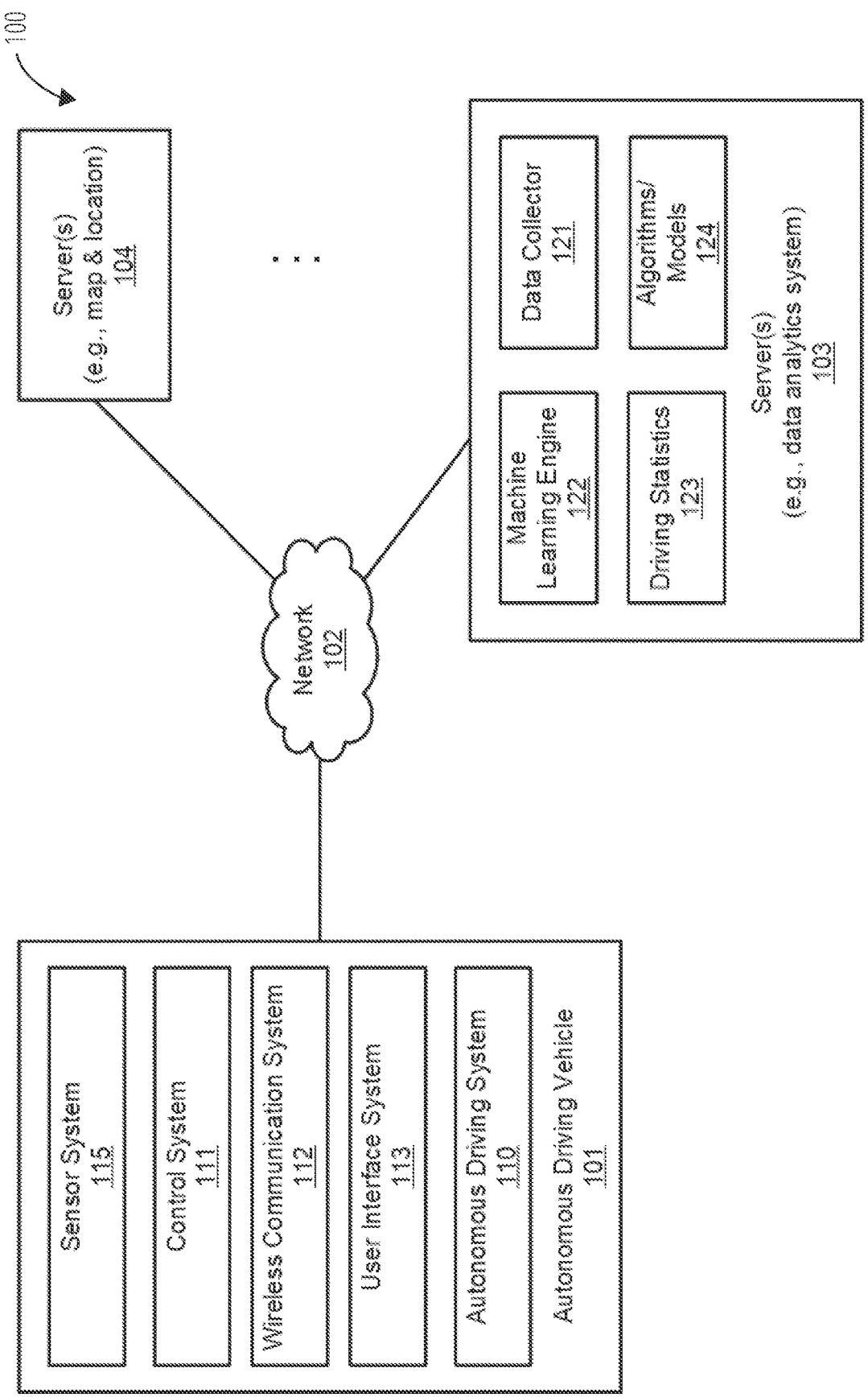
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed, firmware upgrading of ADV components may occur throughout the life cycle of an ADV. These upgrades may fix bugs, introduce new functionality, or modify existing functionality. The ADVs may be distributed at different locations across the planet. Firmware over the air (FOTA) is a mobile software management technique that enables the upgrade of a device anywhere, so long as it may connect to wireless internet service. Although an ADV may perform FOTA operations, the impact of a FOTA failure in the context of an ADV differs from that of other mobile devices due to the high emphasis on reliability and safety of an ADV compared to standard mobile devices (e.g., a mobile phone, a laptop, etc.).

FOTA functionality may be provided through wireless communication, FOTA software, and a host device to execute FOTA operations. FOTA failures may stem from different causes such as, for example, a power failure, a communication failure, a hardware failure, software failure or other unexpected events that may occur during the FOTA process. Given the vast number of FOTA updates that may occur within a system as large as an ADV, some number of FOTA failures are to be expected and mitigated against.

Aspects of the present disclosure may reduce the impact of such failures through improved system design and a failure recovery strategy. In some embodiments, FOTA failure may be mitigated with a failure recovery using a dual boot mechanism, and function dependency matrix analysis may be leveraged to avoid cascaded failure.

In one aspect, an autonomous driving vehicle (ADV) includes a computer network including at least one wireless gateway. The ADV also includes a plurality of network components coupled to the computer network, the plurality of network components including a target device. The ADV also includes processing logic, configured to receive, through a wireless transmission (e.g., the wireless gateway), a firmware to be installed on the target device. The processing logic directs the firmware to the target device through a first network path of the computer network. In response to detecting a failure to update the target device with the firmware, the processing logic directs the firmware to the target device through a second network path of the computer network.

Processing logic may further be configured to count a number of network components in the first network path and select the first network path in response to the first network path having a smallest number of network components than other paths in the computer network between the at least one wireless gateway and the target device. In some embodiments, processing logic may further be configured to count a second number of the plurality of network components in the second network path and select the second network path in response to the second network path having a second smallest number of the plurality of network components than the other paths in the computer network between the at least one wireless gateway and the target device.

Processing logic may further be configured to store, on a host device among the plurality of network components, the firmware and a second firmware of the target device, and in response to detecting the failure, direct the second firmware to the target device through the first network path or through the second network path. The second firmware may have reduced size and capability relative to the firmware (e.g., a tiny version of the firmware). Additionally, or alternatively, the second firmware may be a previous version of the firmware.

The plurality of network components may be configured to perform an autonomous driving vehicle operation (e.g., tasks for driving the ADV autonomously as described in other sections). The plurality of network components may include one or more of: a main central processing unit (CPU), a safety CPU, a main field programmable processing array (FPGA), a safety FPGA, a main microcontroller unit (MCU), or a safety MCU. In some embodiments, all such components are included. In some embodiments, the main CPU, the main MCU, and the main FPGA are powered by a first power source, and the safety CPU, the safety FPGA, and the safety MCU are powered by a second power source. In some embodiments, the first network path includes a first switch that is powered by the first power source and the second network path includes a second switch that is powered by the second power source. In some embodiments, the at least one wireless gateway includes a 4G gateway and a 5G gateway and each of the first network path and the second network path are connected to the 4G gateway and the 5G gateway.

Other technical features may be readily apparent to one skilled in the art from the following figures, descriptions, and claims.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
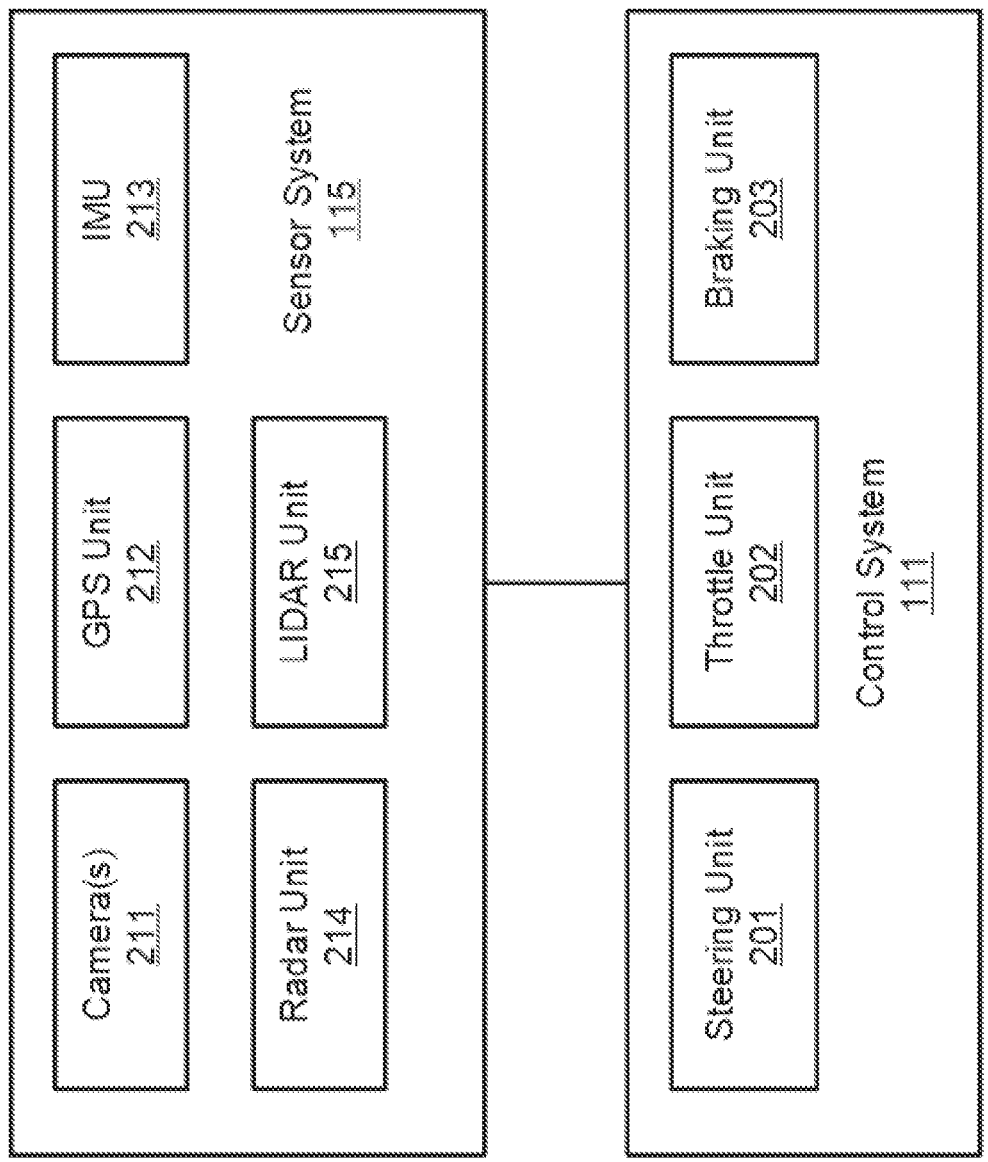
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user (e.g., a passenger) may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently. Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
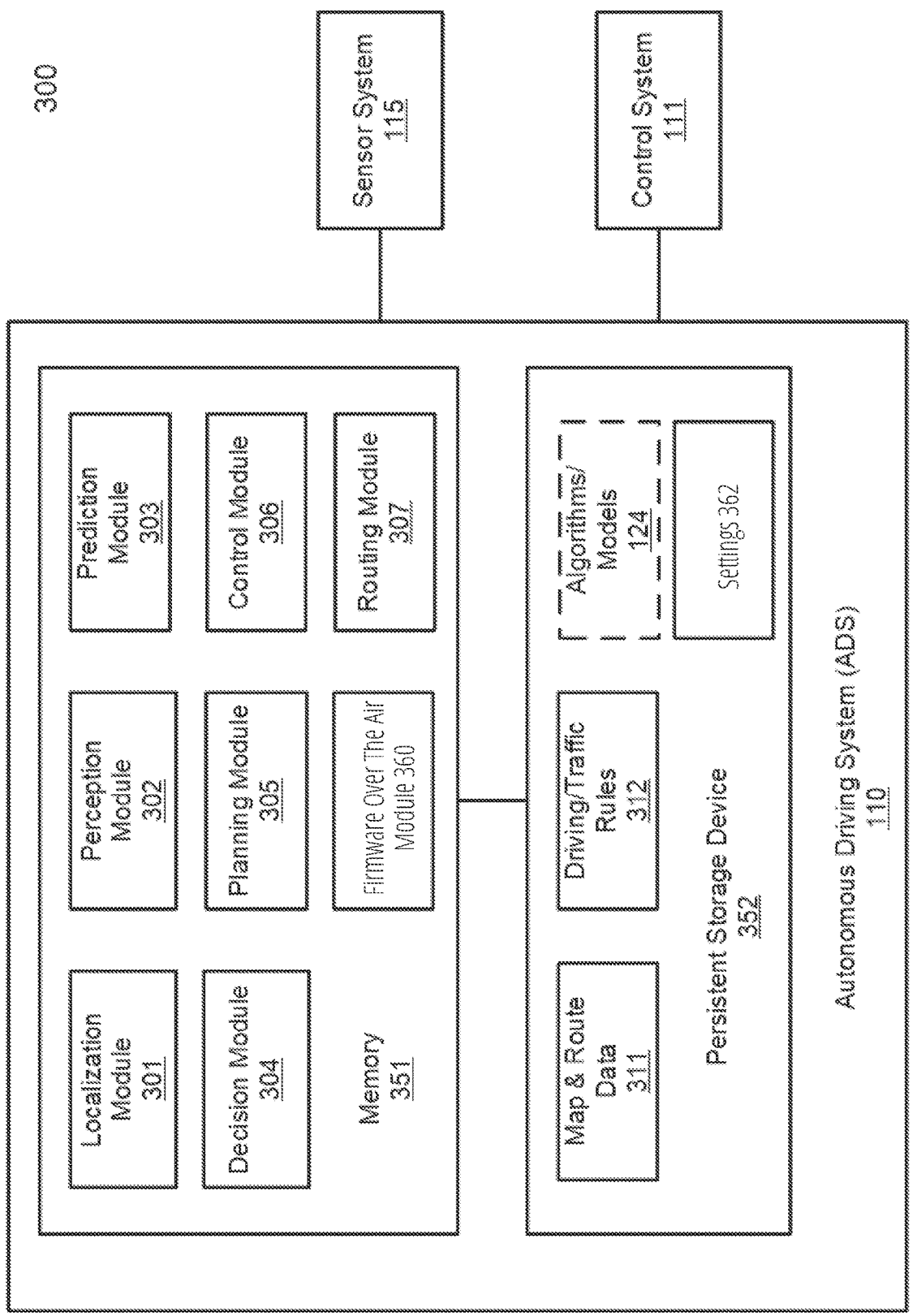
FIG. 3A shows a block diagram illustrating an example of an autonomous driving system used with an autonomous driving vehicle according to one embodiment.
Figure 3B:
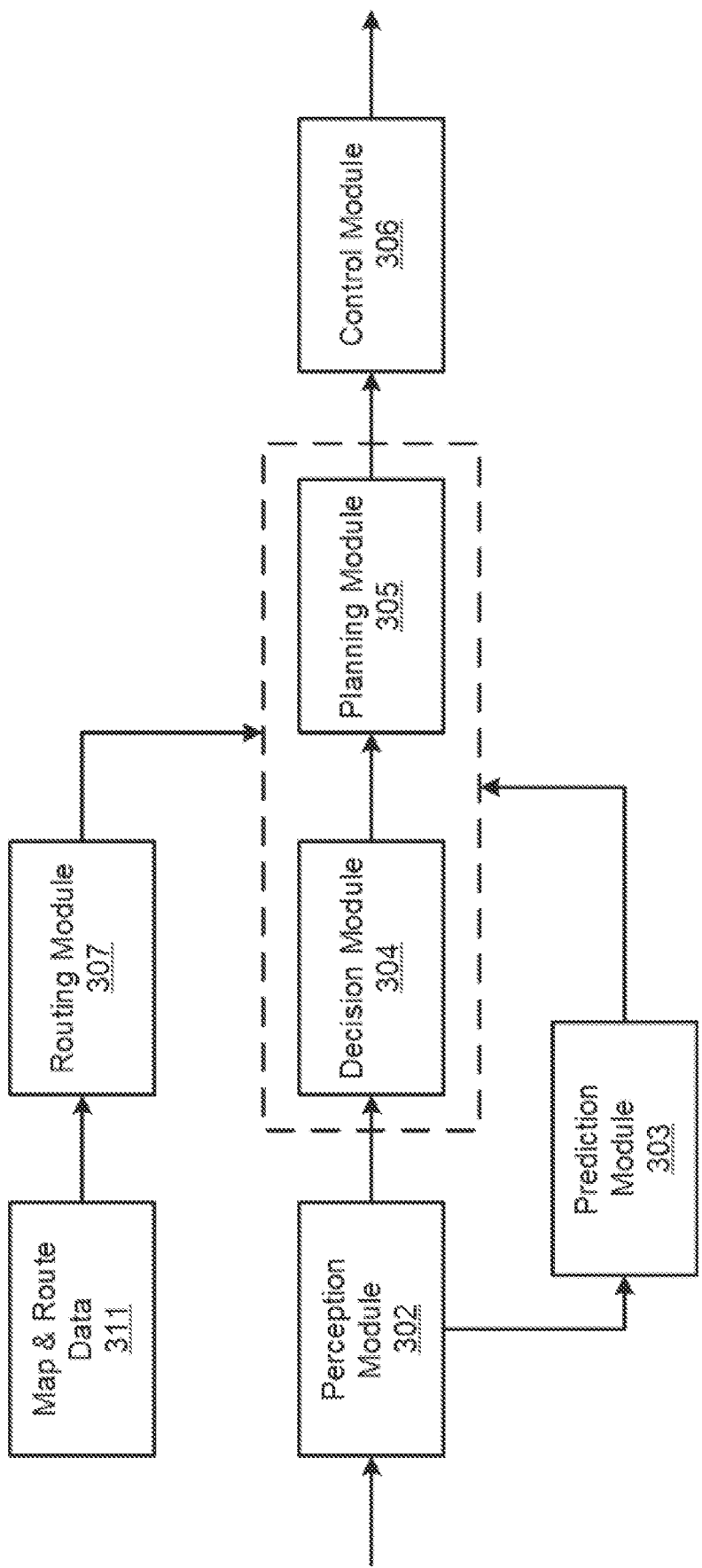
FIG. 3B shows a block diagrams illustrating an example of an autonomous driving system used with an autonomous driving vehicle according to one embodiment.

FIG. 3A and FIG. 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307 [fill in additional modules here].

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

In some embodiments, autonomous driving system 300 includes a firmware over-the-air (FOTA) module 360. FOTA module 360 may utilize component settings 362 which may be stored in persistent storage device 352. The component settings 362 may include device specific information for various target components or network configuration settings.

Component settings 362 may include IP addresses of a component, network routing information, a media access control (MAC) address of a component, user profile information, current firmware of various target components, or other information.

FOTA module 360 may receive, through at least one wireless gateway of a computer network of the ADV, a firmware to be installed on the target device, wherein a plurality of network components including a target device are coupled to the computer network. The FOTA module 360 may direct the firmware to the target device through a first network path of the computer network. In response to detecting a failure to update the target device with the firmware, the FOTA module 360 may direct the firmware to the target device through a second network path of the computer network. Some or all of the operations described in relation to determining the FOTA module 360 may be performed automatically (e.g., without intervention of a human).

Firmware may include settings or instructions for a device that provide low-level control for the device's specific hardware. Firmware may contain basic functions of a device, and may provide hardware abstraction services to higher-level software. For some devices, firmware may serve as an operating system, performing control, monitoring and data manipulation functions. Firmware may be stored in non-volatile memory of a target device, such as read-only memory (ROM), erasable programmable ROM (EPROM), electrically erasable ROM (EEPROM), and flash memory.

Figure 4:
FIG. 4 is a block diagram illustrating system architecture for autonomous driving according to one embodiment.

FIG. 4 is a block diagram illustrating system architecture for autonomous driving according to one embodiment. System architecture 400 may represent system architecture of an autonomous driving system as shown in FIG. 3A and FIG. 3B.

Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302.

In one embodiment, there is an additional layer including the functionalities of prediction module 303 and/or decision module 304. Alternatively, such functionalities may be included in PNC layer 402 and/or perception layer 403.

System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

One or more of the layers may be involved in performing firmware updates to components on the ADV. In some examples, the FOTA module 360 may be implemented in application layer 401, driver layer 404, firmware layer 405, hardware layer 406, or a combination thereof.

Figure 5:
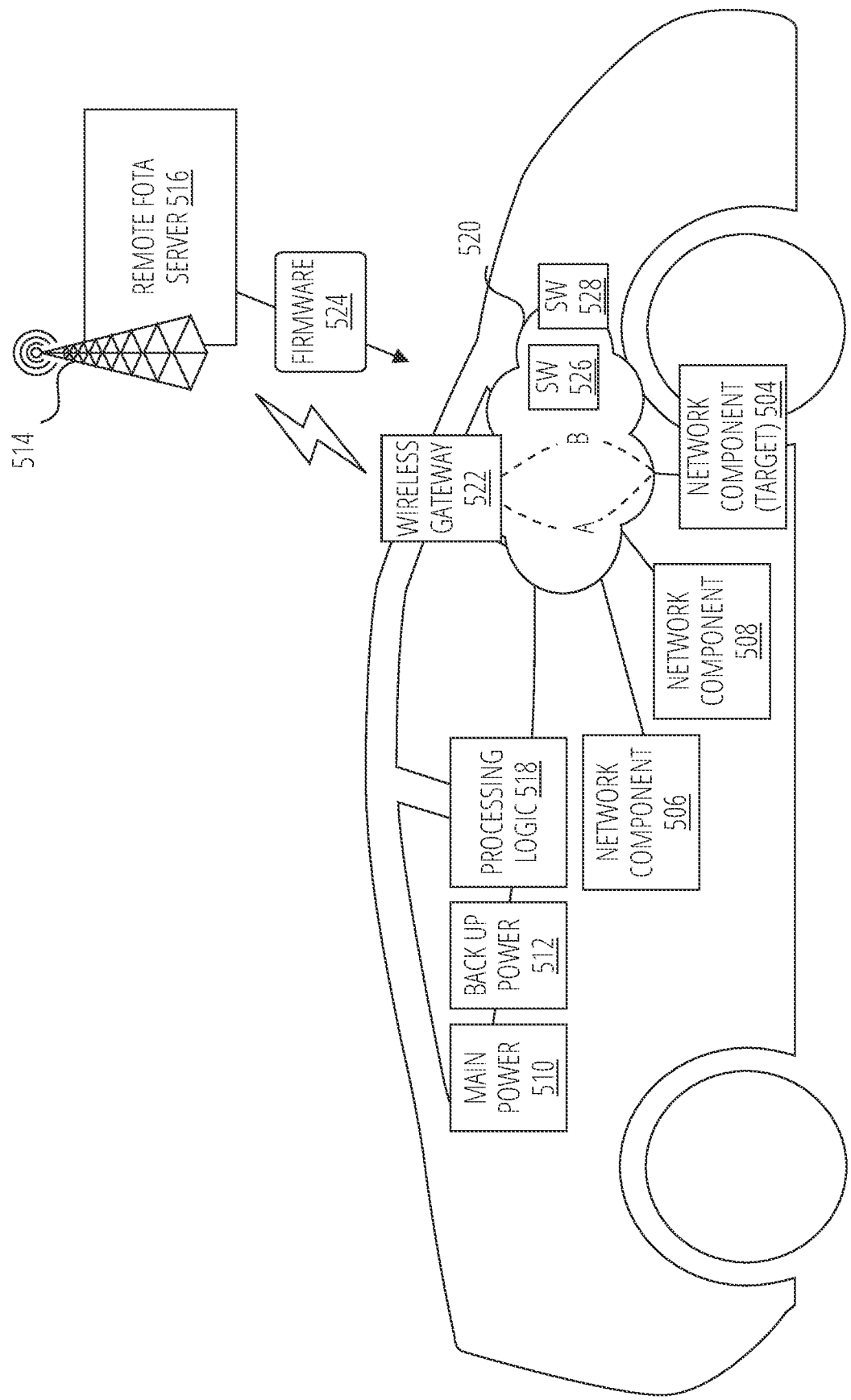
FIG. 5 shows an example of an ADV that is configured to perform firmware over-the-air updates with reduced failure, in accordance with some embodiments.

FIG. 5 shows an example of an ADV 502 that is configured to perform firmware over-the-air updates with reduced failure, in accordance with some embodiments. The ADV 502 may include an autonomous vehicle driving system such as autonomous vehicle driving system 300.

The ADV 502 may include a computer network 520. A computer network may be referred to as a group of interconnected devices (e.g., network components 504, 506, 508) that communicate and share resources with one another. These devices can include computers, servers, routers, switches, and other networking equipment. The communication between devices can be established through wired or wireless connections with a known communication protocol (e.g., TCP/IP, ethernet, Wi-Fi, etc.). In some examples, computer network 520 may comprise a local area networks (LAN).

The computer network 520 may comprise at least one wireless gateway 522. A plurality of network components (504, 506, and 508) are coupled to the computer network 520. The plurality of network components may include a target device 504. A target device 504 may be referred to as a device that is the target of a firmware update or a FOTA target.

ADV 502 may include processing logic 518 which may comprise hardware, software, or a combination thereof. Processing logic 518 may be configured to serve as a FOTA module and perform FOTA operations as described. Processing logic 518 may be performed by one or more host devices, which may be distributed throughout one or more of the network components.

Processing logic 518 may receive firmware 524 to be installed on the target device 504, through wireless gateway 522. The firmware 524 may be provided from a remote FOTA server 516. In some aspects, wireless gateway 522 may communicate with a cellular network 514 (e.g., 2G, LTE, 4G, 5G, or other cellular network). Processing logic 518 may direct the firmware 524 to the target device through a first network path (e.g., path A) of the computer network 520. In response to detecting a failure to update the target device 504 with the firmware 524, processing logic 518 may direct the firmware 524 to the target device 504 through a second network path (e.g., path B) of the computer network.

Processing logic 518 may perform an integrity check to detect that a host device and target device are healthy, or perform a version compatibility check, or perform a data path health check, or a combination of such checks, prior to performing the firmware update. Processing logic 518 may proceed with the firmware update if the one or more checks pass. Similarly, after the firmware is uploaded to the target device 504 and the target device boots, processing logic 518 may check the version number and health of upgraded target device 504 to confirm that the firmware update is successful. If the checks fail after the firmware is uploaded, then processing logic may also direct a different firmware to the target device to try to 'revive' the target device.

Processing logic 518 may count a number of network components in the first network path (e.g., path A) and select the first network path in response to the first network path having a smallest number of network components than other paths in the computer network between the at least one wireless gateway 522 and the target device 504. In such a manner, processing logic may select the shortest network path to perform the FOTA.

Similarly, processing logic 518 may count a second number of the plurality of network components in the second network path (e.g., path B) and select the second network path in response to the second network path having a second smallest number of the plurality of network components than the other paths in the computer network between the at least one wireless gateway 522 and the target device 504. In such a manner, processing logic 518 may select a primary path (e.g., path A) and a backup path (path B) with the shortest paths in network 520. The shortest path may be determined as a lowest number of hops on the network.

In some examples, the at least one wireless gateway 522 comprises a 4G gateway and a 5G gateway. In some examples, each of the first network path (e.g., path A) and the second network path (e.g., path B) are connected to the 4G gateway, the 5G gateway, or both. In such a manner, if the 4G gateway is unable to reach a 4G cellular network, the 5G gateway may still be able to communicate with a 5G cellular network. The risk of communication loss during FOTA is reduced with redundant communications.

The FOTA processing with failure mitigation may include various considerations such as: software functionality; the host device that runs FOTA software (which may be any of the network components 504, 506, and/or 508); power control SW/HW on board; and data communication (DCE) between the remote FOTA server 516 and the target device 504. ADV 502 may include redundant power supplies such as a main power 510 and a backup power 512 which may supply redundant electrical power to the network component, the network 520, or the wireless gateway 522. In some examples, main power 510 may supply power to a first subset of network components that may form path A in network 520, and a first of the wireless gateways 522. Backup power 512 may supply power to a second subset of network components that form path B, and a second of the wireless gateways 522.

In some examples, the first network path may comprise a first switch (e.g., switch 526) that is powered by a first power source (e.g., main power 510) and the second network path may comprise a second switch (e.g., switch 528) that is powered by a second power source (e.g., backup power 512). Thus, if the main power 510 fails, a backup FOTA may still be performed through an alternative wireless gateway and alternative network path that is powered separately by backup power 512. This may be beneficial in situations where a faulty component is responsible for a causing a failure the power supply.

Figure 6:
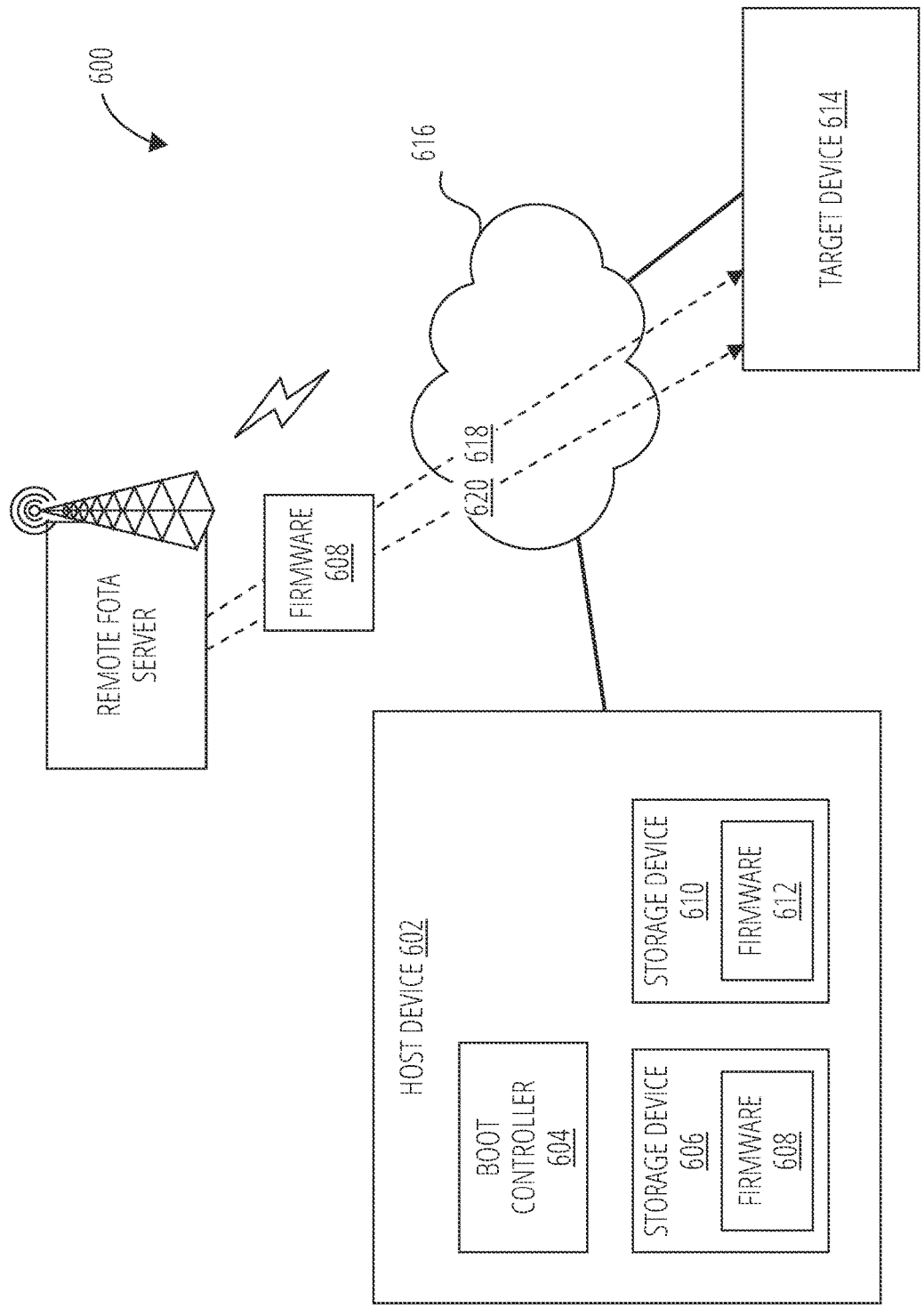
FIG. 6 shows an example of a system for performing a firmware over-the-air update in an ADV, in accordance with some embodiments.

FIG. 6 shows an example of a system 600 for performing a firmware over-the-air (FOTA) update in an ADV, in accordance with some embodiments.

As discussed, processing logic may obtain, through at least one wireless gateway of a computer network 616 of an ADV, a firmware 608 to be installed on the target device 614. A plurality of network components may be coupled to the computer network 616, such as, for example, target device 614 and host device 602. Processing logic may direct the firmware 608 to the target device 614 through a first network path (e.g., 620) of the computer network. In response to detecting a failure to update the target device 614 with the firmware 608, processing logic may route the firmware 608 to the target device 614 through a second network path (e.g., 618) of the computer network 616.

Processing logic may detect a failure by monitoring the target device 614. For example, processing logic may determine that the FOTA has failed if the power consumption or temperature of the target device satisfy a respective threshold. In another example, processing logic may detect the failure if a heartbeat of the target device 614 is not present, or if the target device 614 is unresponsive to polling. Processing logic may detect the failure based on one or more conditions such as those discussed or a combination thereof.

To reduce FOTA failure or mitigate against the failure, network components that serve as host devices (e.g., 602) may support dual booting. In such a scenario, processing logic may implement a safety booting option to allow recovery of the target device 614 in response to a failure. Processing logic may include a boot controller 604 to implement dual booting operations on a host device 602. For example, boot controller 604 may store, on host device 602 the firmware 608 and a second firmware 612. Both firmware 608 and firmware 612 may be compatible with target device 614. In response to detecting the failure of target device 614 with firmware 608, boot controller 604 may direct the second firmware 612 to the target device 614. This second firmware 612 may be routed to target device 614 through the first network path 620 or the second network path 618. For example, if processing logic determines that the first network path 620 has a failed component, processing logic may route firmware 612 to the target device 614 through the second network path 618.

Firmware 612 may be referred to as a backup firmware. In some examples, firmware 612 has reduced size and capability relative to the firmware 608. For example, firmware 612 may support only the essential functionalities of the target device. In some examples, firmware 612 is a previous version of the firmware 608. For example, firmware 608 may be version 1.2 while firmware 612 may be a previous version 1.1.

In some examples, to help safety monitoring, the boot controller 604 may perform integrity check of a target device before and after the FOTA process. For example, boot controller 604 may obtain the current version of firmware from target device 614 and verify that this version is compatible with firmware 608.

In some examples, a single boot storage device of the host device 602 may be physically or logically divided into multiple partitions to form storage device 606 and 610. In other examples, storage device 606 and storage device 610 may be separate hardware devices. Regardless, different firmware versions may be stored separately on host device 602. During booting stage of target device 614, boot controller 604 may monitor target device 614 to determine if target device 614 has failed to boot with firmware 608. If so, boot controller 604 will switch to the storage device 610 and route firmware 612 to target device 614. This may allow target device 614 to recover from a failed firmware update, even if the target operates in a degraded mode (e.g., with a smaller firmware image).

It should be understood that, although shown separately, the target device 614 and the host device 602 may be the same component. In such a case, the host device may perform its own FOTA update.

In some examples, all FOTA paths (e.g., from a gateway to a target device) are dual redundant (e.g., have two separate paths) and are distributed in two power domains. If one communication path between a host device or target device and the remote FOTA server (RFS) fails, or one power domain fails, the other optional path will be used for failure recovery.

Figures 7, 8:
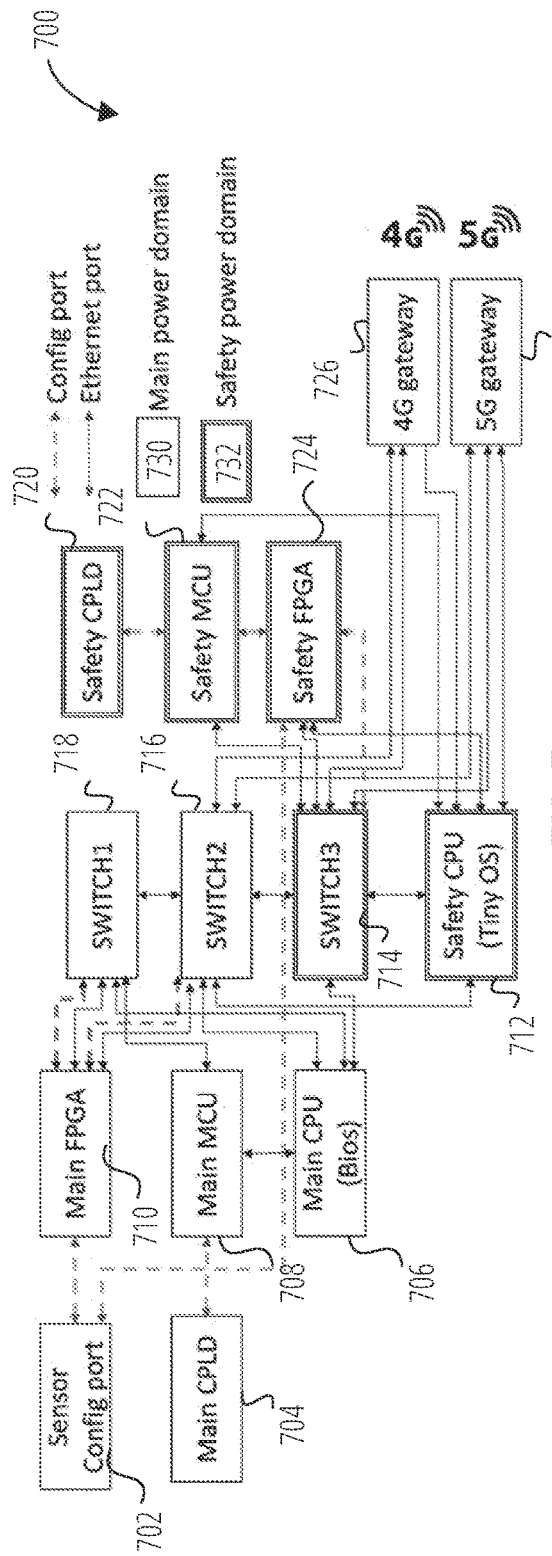
FIG. 7 shows an example of a computer network of an ADV that is configured to perform FOTA, in accordance with some embodiments
FIG. 8 shows a table that indicates a first network path and a second network path for each FOTA target, in accordance with some embodiments.

FIG. 7 shows an example of a computer network of an ADV that is configured to perform FOTA, in accordance with some embodiments. FIG. 8 shows a table with FOTA targets and corresponding network paths, in accordance with some embodiments. The table of FIG. 8 may correspond to the example of FIG. 7.

Computer network 700 of FIG. 7 includes a plurality of network components such as, for example, a main complex programmable logic device (CPLD) 704, a main field programmable gate array (FPGA) 710, a main central processing unit (CPU), and a main microprocessor unit (MCU) 708.

These devices may be communicatively coupled to each other through their respective ethernet ports either directly or indirectly, to form part of the computer network 700. These devices may be configured to perform autonomous driving vehicle operations, such as those described with respect to sensor system 115, control system 111, or autonomous driving system 110. Further, each of these main devices may have a safety counterpart to provide the same or a reduced set of capability, for redundancy (e.g., in case one of the main components fails). For example, the computer network 700 may include a safety CPLD 720, a safety FPGA 724, a safety CPU 712, and a safety MCU 722 that may perform the same tasks or a subset of the tasks performed by their main counterparts.

The network 700 may also include a plurality of switches such as network switch 714, network switch 716, and network switch 718. Each network switch enables devices that are connected to the network switch to communicate with each other by using packet switching to receive and forward data to a destination device.

In some examples, the MCUs (708, 722) and CPLD (704, 720) may be configured to perform board power control and system monitoring, as well as performing dual booting to reduce the risk of FOTA failure due to power loss. In some examples, each of the main CPU 706, Safety CPU 712, main FPGA 724, safety FPGA 724, main MCU 708, and safety MCU 722 may be configured to serve as a host device (as described with respect to host device 602) and perform a dual boot of a target device with firmware and a backup firmware.

Further, network 700 may have a redundant network path architecture for each target device, as shown in FIG. 7 and FIG. 8. Each target device (which may also be referred to as a FOTA target) may have two separate paths from itself to one or more gateways (726, 728).

Table 800 indicates network paths for each of the FOTA targets in FIG. 7. from the FOTA target to the 4G/5G gateway. The paths are selected based on finding a shortest path, to reduce dependence of elements involved in the data communication process, which may increase reliability of the path. In this example, the shortest path may include one or two components (or 'hops'). Such an architecture minimizes the hop count for the FOTA process, while maintaining flexibility for the normal system communications. In the table 800, the 4G and 5G gateway combination may also provide communication redundancy (e.g., in the FOTA process) by being able to connect to different cellular network types.

In some examples, the computer network 700 is powered off of a main power domain 730 and a safety power domain 732. The main power domain 730 and the safety power domain 732 may be separate (e.g., including separate power supplies). In some examples, the safety power domain 732 may be on constantly, and those safety components on the safety power domain may consume low power. The main power domain 730 may be activated in response to when safety system works normally, and off at other times. Failure of powering main or safety system may result in blocking the communication and booting of the target devices. The main MCU 708 and main CPLD 704 may control operation of the main power domain 730. Similarly, the safety MCU 722 and safety CPLD 720 may control operation of the safety power domain 732. Each MCU and CPLD may support dual booting, such that if a new version of firmware fails for that MCU or CPLD, the backup firmware (e.g., stored in a separate boot partition) is activated to boot the respective MCU or CPLD.

In this computer network 700, switch 714 may be powered in the safety power domain 732, while switch 718 and switch 716 are powered in the main power domain 730. In addition to ethernet communications, components may be coupled through configuration ports that allows one device to read or write configurable settings on another device. Further, the main FPGA 710 or safety FPGA 724 may configure sensor config port 702 which may, in turn, configure settings of sensors in sensor system 115.

FIG. 8 shows a table 800 that indicates a first network path and a second network path for each FOTA target, with respect to the network architecture of FIG. 7. For example, main CPU with ID of '1' has a first network path 1.a, and a second network path 1.b that it may use to perform a FOTA update. If this first network path fails or is unavailable, a second network path 1.b may be used to perform the FOTA update. In some examples, if the same firmware fails with the first path and then the second path, processing logic may then try to update the target with a different version of firmware. The first network path 1.a includes switch 716, and 4G/5G gateway (726, 728). It should be understood that 4G/5G includes the 4G gateway, the 5G gateway, or both.

In this example, safety CPU with ID of '2' has a first network path 2.a and a second network path 2.b. Here, the first network path 2.a includes switch 726 and the 4G/5G gateway (726, 728). The second network path 2.b includes switch 714 and the 4G/5G gateway (726, 728).

Main FPGA with ID of '3' has a first network path 3.a and a second network path 3.b. Here, the first network path 3.a includes switch 726 and the 4G/5G gateway (726, 728). The second network path 3.b includes switch 714 and the 4G/5G gateway (726, 728).

Safety FPGA with ID of '4' has a first network path 4.a and a second network path 4.b. Here, the first network path 4.a includes switch 714 and the 4G/5G gateway (726, 728). The second network path 4.b includes safety CPU 712 and the 4G/5G gateway (726, 728).

Main MCU with ID of '5' has a first network path 5.a and a second network path 5.b. Here, the first network path 5.a includes switch 718 and the 4G/5G gateway (726, 728). The second network path 5.b includes switch 714 and the 4G/5G gateway (726, 728).

Safety MCU with ID of '6' has a first network path 6.a and a second network path 6.b. Here, the first network path 6.a includes switch 714 and the 4G/5G gateway (726, 728). The second network path 6.b includes safety CPU 712 and the 4G/5G gateway (726, 728).

The network architecture of network 700 is one example. Variations in the arrangement may be realized without departing from the scope of the present disclosure.

Figure 9:
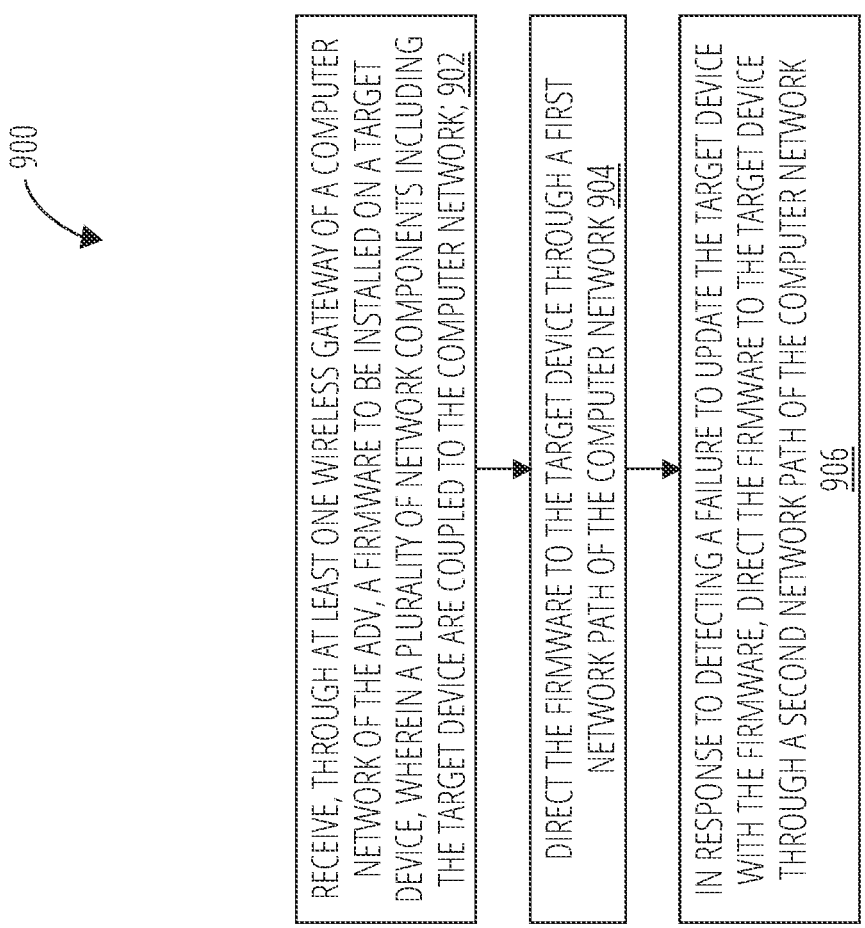
FIG. 9 shows a method for performing FOTA in an ADV in accordance with some embodiments.

FIG. 9 shows a method 900 for performing FOTA in an ADV in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Method 900 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 902, processing logic receives, through at least one wireless gateway of a computer network of the ADV, a firmware to be installed on a target device, wherein a plurality of network components including the target device are coupled to the computer network. The at least one wireless gateway may include a 4G wireless gateway, a 5G wireless gateway, or both. In some examples, the wireless gateway may further comprise a Wi-Fi gateway.

At block 904, processing logic directs the firmware to the target device through a first network path of the computer network. As described, the first network path may be selected as having a shortest path from the target to the at least one wireless gateway.

At block 906, in response to detecting a failure to update the target device with the firmware, processing logic directs the firmware to the target device through a second network path of the computer network. Further, as described in other sections, the method may include other operations such as, but not limited to, directing second firmware to the target device in response to the detected failure, which may be performed from the first network path or second network path.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. An autonomous driving vehicle (ADV) comprising:
   a computer network internal to the ADV including at least one wireless gateway of the ADV;
   a plurality of network components internal to the ADV that are coupled to the computer network, the plurality of network components including a target device; and
   a processor, configured to:
   receive, through the at least one wireless gateway, a firmware to be installed on the target device;
   select a first network path internal to the ADV for installing the firmware on the target devices, in response to the first network path having a smallest number of network components, relative to other network paths in the computer network internal to the ADV, between the at least one wireless gateway and the target device;
   direct the firmware to the target device through a first network path of the computer network; and
   in response to detecting a failure to update the target device with the firmware, direct the firmware to the target device through a second network path of the computer network.

2. The ADV of claim 1, wherein the first network path has a lowest number of hops on the computer network internal to the ADV from the at least one wireless gateway to the target device.

3. The ADV of claim 1, wherein the processor is further configured to count a second number of the plurality of network components in the second network path and select the second network path in response to the second network path having a second smallest number of the plurality of network components than the other paths in the computer network between the at least one wireless gateway and the target device.

4. The ADV of claim 1, wherein the processor is further configured to;
   store, on a host device among the plurality of network components, the firmware and a second firmware of the target device, and
   in response to detecting the failure, direct the second firmware to the target device through the first network path or through the second network path.

5. The ADV of claim 4, wherein the second firmware has reduced size and capability relative to the firmware.

6. The ADV of claim 4, wherein the second firmware is a previous version of the firmware.

7. The ADV of claim 1, wherein the plurality of network components are configured to perform an autonomous driving vehicle operation, the plurality of network components comprising: a main central processing unit (CPU), a safety CPU, a main field programmable processing array (FPGA), a safety FPGA, a main microcontroller unit (MCU), and a safety MCU.

8. The ADV of claim 7, wherein the main CPU, the main MCU, and the main FPGA are powered by a first power source, and the safety CPU, the safety FPGA, and the safety MCU are powered by a second power source.

9. The ADV of claim 8, wherein the first network path comprises a first switch that is powered by the first power source and the second network path comprises a second switch that is powered by the second power source.

10. The ADV of claim 1, wherein the at least one wireless gateway comprises a 4G gateway and a 5G gateway and each of the first network path and the second network path are connected to the 4G gateway and the 5G gateway.

11. A method for performing firmware over the air (FOTA) with an autonomous driving vehicle (ADV) comprising:
receiving, through at least one wireless gateway of a computer network that is internal to the ADV, a firmware to be installed on a target device of the ADV, wherein a plurality of network components including the target device are coupled to the computer network and are internal to the ADV;
select a first network path internal to the ADV for installing the firmware on the target devices, in response to the first network path having a smallest number of network components, relative to other network paths in the computer network internal to the ADV, between the at least one wireless gateway and the target device;
directing the firmware to the target device through a first network path of the computer network; and
in response to detecting a failure to update the target device with the firmware, directing the firmware to the target device through a second network path of the computer network.

12. The method of claim 11, wherein the first network path has a lowest number of hops on the computer network internal to the ADV from the at least one wireless gateway to the target device.

13. The method of claim 11, further comprising counting a second number of the plurality of network components in the second network path and selecting the second network path in response to the second network path having a second smallest number of the plurality of network components than the other paths in the computer network between the at least one wireless gateway and the target device.

14. The method of claim 11, further comprising;
storing, on a host device among the plurality of network components, the firmware and a second firmware of the target device, and
in response to detecting the failure, directing the second firmware to the target device through the first network path or through the second network path.

15. The method of claim 14, wherein the second firmware has reduced size and capability relative to the firmware.

16. The method of claim 14, wherein the second firmware is a previous version of the firmware.

17. The method of claim 11, wherein the plurality of network components are configured to perform an autonomous driving vehicle operation, the plurality of network components comprising: a main central processing unit (CPU), a safety CPU, a main field programmable processing array (FPGA), a safety FPGA, a main microcontroller unit (MCU), and a safety MCU.

18. The method of claim 17, wherein the main CPU, the main MCU, and the main FPGA are powered by a first power source, and the safety CPU, the safety FPGA, and the safety MCU are powered by a second power source.

19. The method of claim 18, wherein the first network path comprises a first switch that is powered by the first power source and the second network path comprises a second switch that is powered by the second power source.

20. The method of claim 11, wherein the at least one wireless gateway comprises a 4G gateway and a 5G gateway and each of the first network path and the second network path are connected to the 4G gateway and the 5G gateway.

* * * * *